(12) United States Patent
Li et al.

(10) Patent No.: US 11,522,442 B1
(45) Date of Patent: Dec. 6, 2022

(54) POWER FACTOR OF AC-DC OFF-LINE POWER SUPPLIES UNDER LIGHT LOAD CONDITION

(71) Applicant: Cisco Technology, Inc., San Jose, CA (US)

(72) Inventors: Ruqi Li, Fremont, CA (US); Sung K. Baek, San Ramon, CA (US); Douglas P. Arduini, San Ramon, CA (US); Xiqun Zhu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/444,089

(22) Filed: Jul. 30, 2021

(51) Int. Cl.
*H02M 1/44* (2007.01)
*H02M 1/42* (2007.01)
*H02M 1/00* (2006.01)

(52) U.S. Cl.
CPC ....... *H02M 1/4225* (2013.01); *H02M 1/0032* (2021.05); *H02M 1/44* (2013.01)

(58) Field of Classification Search
CPC ..... H02M 1/4225; H02M 1/0032; H02M 1/44
See application file for complete search history.

(56) References Cited

U.S. PATENT DOCUMENTS

| | | | |
|---|---|---|---|
| 8,659,919 B2 | 2/2014 | Hua et al. | |
| 9,438,119 B1 * | 9/2016 | Hwang | H02M 3/335 |
| 11,271,473 B2 * | 3/2022 | Martinez Perez | H02M 3/155 |
| 11,349,387 B2 * | 5/2022 | Dai | H02M 1/4225 |
| 2010/0253307 A1 | 10/2010 | Chen et al. | |
| 2011/0305052 A1 | 12/2011 | Saint-Pierre | |
| 2015/0214833 A1 | 7/2015 | Ramabhadran et al. | |
| 2016/0254743 A1 | 9/2016 | Han et al. | |
| 2019/0097528 A1 | 3/2019 | Wang et al. | |

OTHER PUBLICATIONS

Jian Sun, "On the zero-crossing distortion in single-phase PFC converters," in IEEE Transactions on Power Electronics, vol. 19, No. 3, pp. 685-692, May 2004, doi: 10.1109/TPEL.2004.826491.
H. Youn, J. Lee, J. Baek and G. Moon, "A Digital Phase Leading Filter Current Compensation (PLFCC) Technique for CCM Boost PFC Converter to Improve PF in High Line Voltage and Light Load Conditions," in IEEE Transactions on Power Electronics, vol. 31, No. 9, pp. 6596-6606, Sep. 2016, doi: 10.1109/TPEL.2015.2489204.

(Continued)

*Primary Examiner* — Adolf D Berhane
(74) *Attorney, Agent, or Firm* — Patterson + Sheridan, LLP

(57) ABSTRACT

Embodiments herein describe control circuitry for operating a PFC converter in an AC-DC power supply under light loading conditions. The embodiments herein improve the power factor by identifying an optimized phase offset (γ) between an AC reference voltage and an AC reference current used to control the PFC converter. In one embodiment, the control circuitry iteratively changes the phase offset between the reference voltage and current and measures its impact on the power factor. The control circuitry then selects the phase offset that results in the best power factor to use when operating the PFC converter under light loading conditions.

20 Claims, 14 Drawing Sheets

(56) References Cited

OTHER PUBLICATIONS

D. M. Van de Sype, Koen De Gusseme, A. P. M. Van den Bossche and J. A. Melkebeek, "Duty-ratio feedforward for digitally controlled boost PFC converters," in IEEE Transactions on Industrial Electronics, vol. 52, No. 1, pp. 108-115, Feb. 2005, doi: 10.1109/TIE.2004.841127.

K. P. Louganski and J. Lai, "Current Phase Lead Compensation in Single-Phase PFC Boost Converters With a Reduced Switching Frequency to Line Frequency Ratio," in IEEE Transactions on Power Electronics, vol. 22, No. 1, pp. 113-119, Jan. 2007, doi: 10.1109/TPEL.2006.886656.

J. Shin and B. Cho, "Digitally Implemented Average Current-Mode Control in Discontinuous Conduction Mode PFC Rectifier," in IEEE Transactions on Power Electronics, vol. 27, No. 7, pp. 3363-3373, Jul. 2012, doi: 10.1109/TPEL.2011.2180927.

\* cited by examiner

POWER FACTOR OF AC-DC OFF-LINE POWER SUPPLIES UNDER LIGHT LOAD CONDITION

TECHNICAL FIELD

Embodiments presented in this disclosure generally relate to operating a Power Factor Correction (PFC) converter under light loading conditions.

BACKGROUND

AC-DC off-line power supplies typically have Power Factor Correction (PFC) when the input power is over 75 W. Moreover, to meet Electromagnetic Interference (EMI) compliance requirements, an EMI filter (or filters), composed of a common-mode choke line-to-line and line-to-ground capacitors, are often used. Under moderate or heavy loading conditions, a PFC Boost converter in an AC-DC power supply operates in Continuous Conduction Mode (CCM), and effects of the inherent current distortion due to converter topology limitations and EMI filter capacitors on the power supply power factor are negligible, which means the power supply can readily meet the IEC61000-3-2 Harmonic Current Emission requirements with a near unity power factor. However, current PFC converter designs do not sufficiently consider the performance of the power supply under light loading conditions (typically 15% below the maximum rated output power of the power supply).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
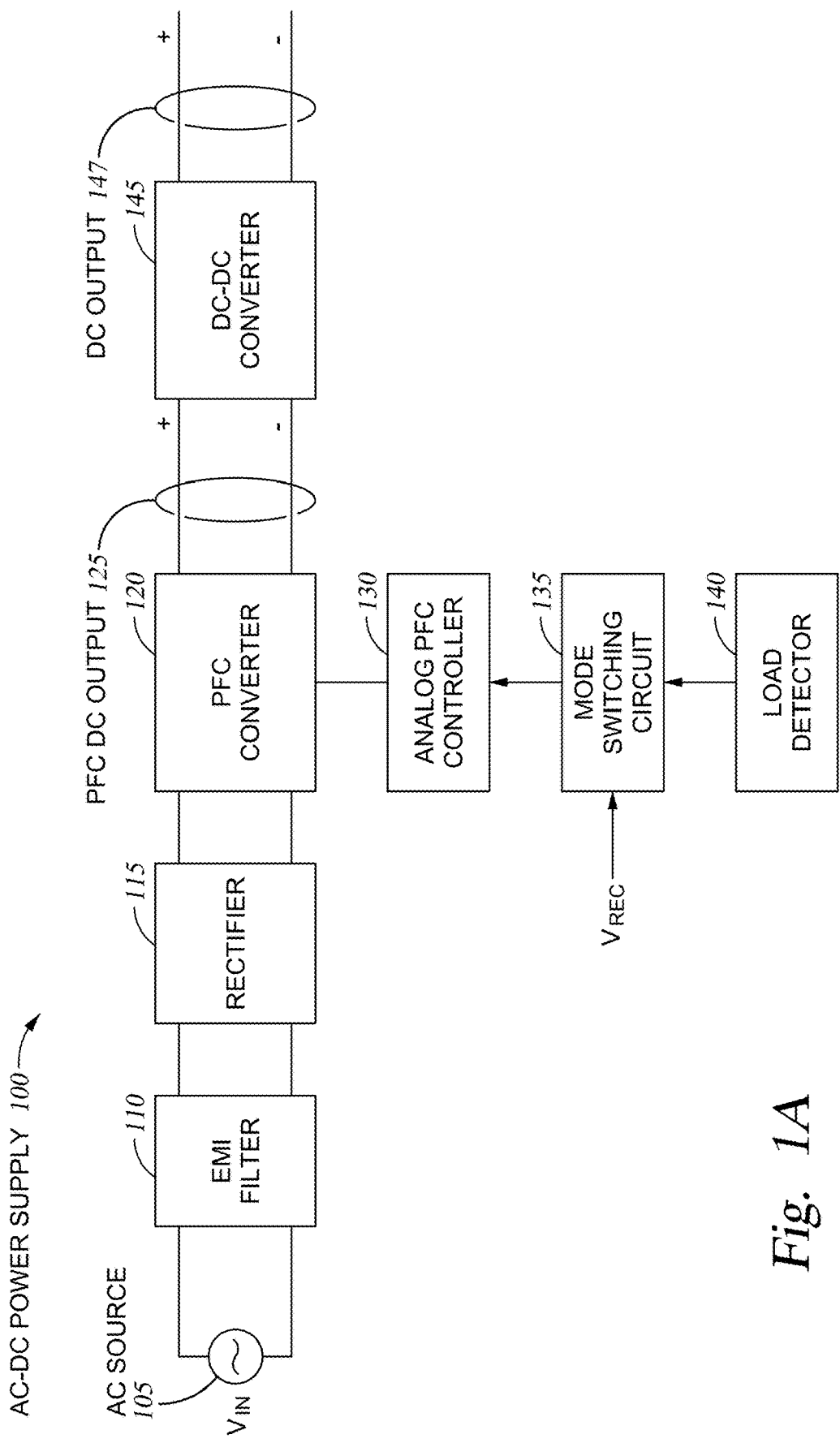
FIGS. 1A and 1B are block diagrams of AC-DC power supplies with optimized performance under light loading conditions, according to embodiments herein.

One embodiment presented in this disclosure is a control system for a Power Factor Correction (PFC) converter including circuitry and a method configured to determine that power outputted by the PFC converter is below a threshold corresponding to a light loading condition and identify an optimized phase offset between an AC reference voltage and an AC reference current used to control the PFC converter by iteratively changing the phase offset between the AC reference voltage and the AC reference current, determining a power factor of the PFC converter based on a changed value of the phase offset, and determining whether the power factor is better than a previous power factor determined when the phase offset had a different value.

One embodiment presented in this disclosure is a power supply that includes a PFC converter and control circuitry to determine that power outputted by the PFC converter is below a threshold corresponding to a light loading condition and identify an optimized phase offset between an AC reference voltage and an AC reference current used to control the PFC converter by iteratively changing the phase offset between the AC reference voltage and the AC reference current, determining a power factor of the PFC converter based on a changed value of the phase offset, and determining whether the power factor is better than a previous power factor determined when the phase offset had a different value.

EXAMPLE EMBODIMENTS

Embodiments herein describe control circuitry for operating a PFC converter in an AC-DC power supply under light loading conditions. Under light loading conditions (typically 15% below the maximum rated output power), the PFC converter enters Discontinuous Conduction Mode (DCM) of operation where the ratio of the peak inductor current to the average inductor current, or the AC line current, becomes very high. As a result, the combined effects of inherent current distortion of the PFC converter and the reactive current of the capacitors in an EMI filter, which degrade the power factor of the power supply, can no longer be ignored. This, in turn, causes both power distribution system root mean square (RMS) current/power loss and power-line voltage distortion to increase.

Since the EMI filter capacitors are typically connected directly cross the AC input voltage of the power supply, and are outside the converter control loop, except for removing these capacitors, little can be done to reduce their effect on degrading the power factor under light operating conditions. Instead, the embodiments herein improve the power factor by identifying an optimized phase offset (γ) between an AC reference voltage and an AC reference current used to control the PFC converter. In one embodiment, the control circuitry iteratively changes the phase offset between the AC reference voltage and current and measures its impact on the power factor. The control circuitry then selects the phase offset that results in the best power factor when operating the PFC converter under light loading conditions.

Figure 1B:
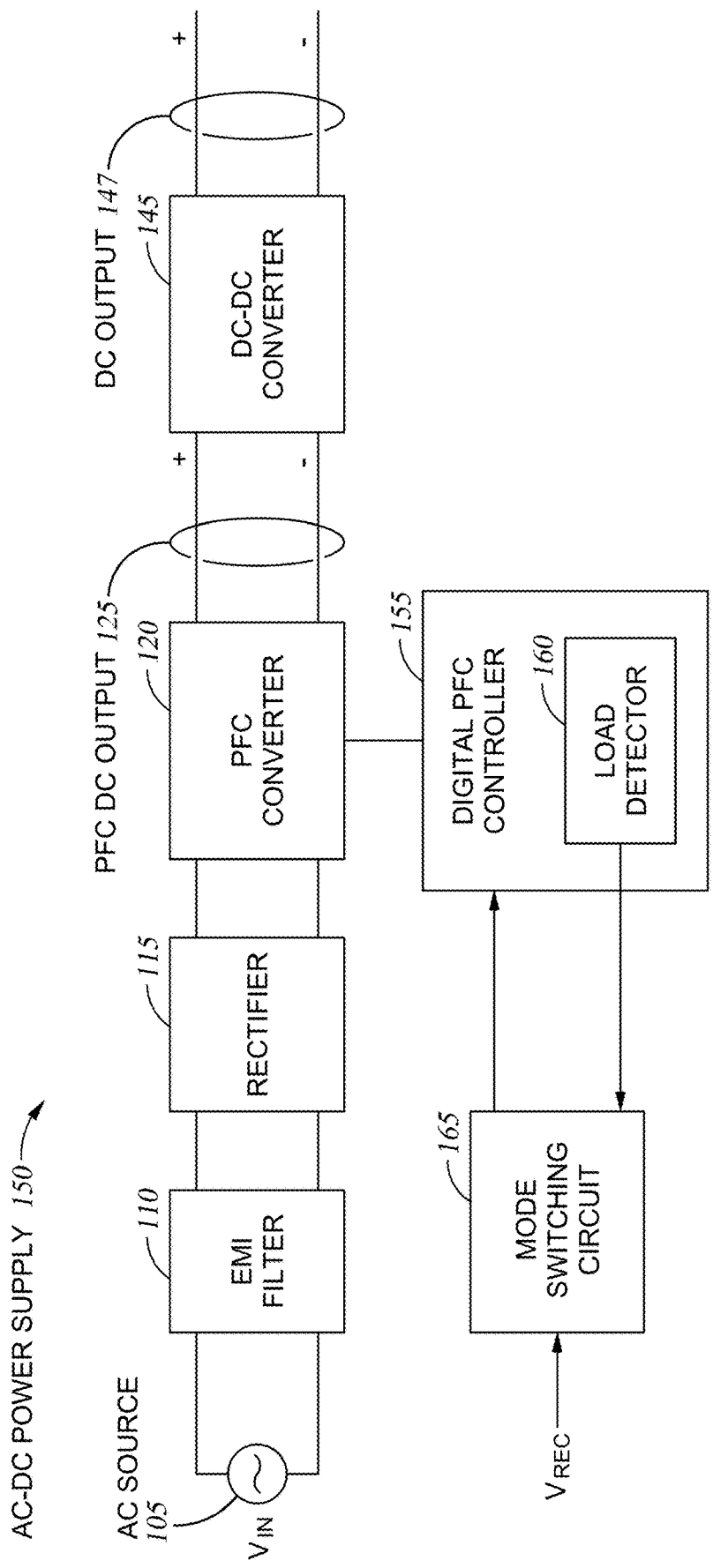

FIGS. 1A and 1B are block diagrams of AC-DC power supplies with optimized performance under light loading conditions, according to embodiments herein. FIG. 1A illustrates an AC-DC power supply 100 that includes an AC source 105 coupled to an EMI filter 110, which is in turn coupled to a rectifier 115 and a PFC converter 120. The AC source 105 can be AC grid (e.g., a power grid) or utility grid. The EMI filter 110 can include a common-mode choke or chokes and capacitors to suppress electromagnetic interference noise generated by the AC-DC power supply 100. Specific designs for the EMI filter 110 are discussed in FIGS. 3A and 3B below.

Figure 3A:
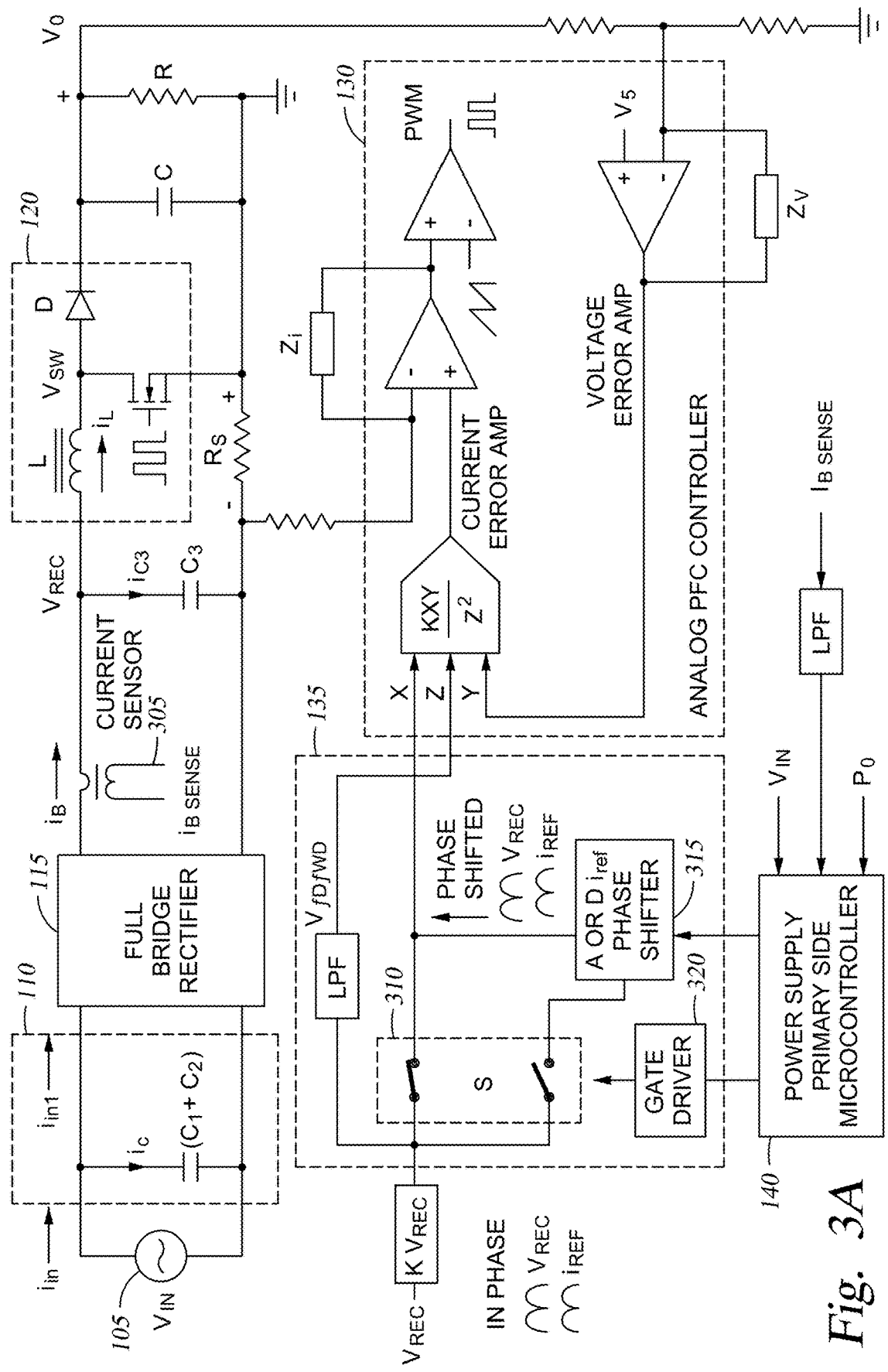
FIGS. 3A and 3B illustrate AC-DC power supplies with optimized performance under light loading conditions, according to embodiments herein.
Figure 3B:
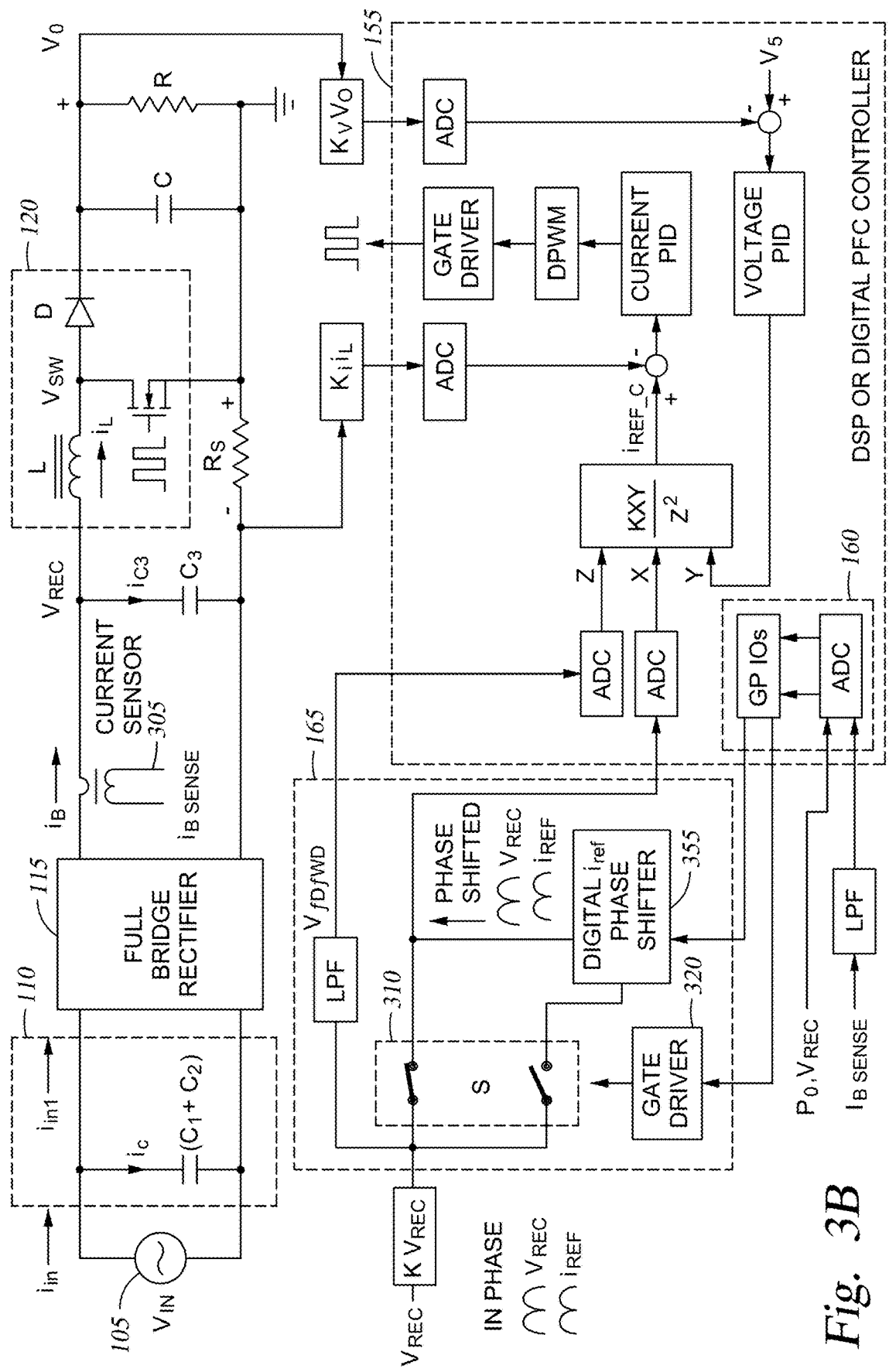

The rectifier 115 converts the AC voltage into a rectified AC voltage. In one embodiment, the rectifier 115 is a full-bridge rectifier. The PFC converter 120 receives the rectified AC voltage from the rectifier 115. Linear power supplies often have a low power factor and introduce harmonic currents into the system. The overall effect of a single power supply is not large, but when considering there are millions of such supplies in use, the combined effect on power quality of these power supplies can be substantial. The PFC converter 120 increases the power factor and reduces harmonic currents. In one embodiment, the PFC converter 120 is a boost PFC converter that can include a switch (e.g., a transistor), a diode, and an inductor. The general goal of the boost PFC converter is to control the AC input current to be in phase with the AC input sinusoidal voltage source 105 by modulating the switch Q gate drive signal with a time varying duty cycle as shown in FIG. 3A and FIG. 3B.

Under moderate or heavy loading conditions, the PFC converter 120 operates in Continuous Conduction Mode (CCM), and effects of the inherent current distortion due to converter topology limitations and capacitors in the EMI filter 110 on the power supply power factor are negligible. However, as discussed above, under light loading conditions, the PFC converter 120 operates in a Discontinuous Conduction Mode (DCM) and the combined effects of inherent current distortion of the PFC converter 120 and the reactive current of the capacitors in the EMI filter 110, which degrade the power factor of the power supply, can no longer be ignored.

To prevent or mitigate this degradation to the power factor, the power supply 100 includes an analog PFC controller 130, a mode switching circuit 135, and a load detector 140. The load detector 140 can be any circuitry that detects when the power supply 100 is currently experiencing light loading condition (e.g., when a DC output power 147 is less than 15% of the maximum rated output power of the power supply 100). In response, the load detector 140 sends a control signal to the mode switching circuit 135 which switches the power supply 100 from operating in a normal mode (where the loading conditions are heavy or moderate) to a light mode (where the loading conditions are light).

The mode switching circuit 135 receives a rectified AC voltage ($V_{rec}$) which is used as an AC reference voltage. In one embodiment, the AC reference voltage $V_{rec}$ is the output of the rectifier 115. Put differently, the output of the rectifier 115 is input into both the PFC converter 120 and the mode switching circuit 135.

When operating under the light loading conditions, the mode switching circuit 135 generates an AC reference current that is phase-shifted with respect to the AC reference voltage. The AC reference current and voltage are provided to the analog PFC controller 130. The phase offset between the reference current and voltage due to the phase shift causes the PFC controller to change an electrical parameter (e.g., a voltage or current) in the PFC converter 120 which in turns alters the power factor of the power supply 100. As discussed in more detail below, the mode switching circuit can iteratively adjust the phase offset between the AC reference current and voltage until identifying the phase offset that results in the best power factor. The power supply 100 then continues to use this phase offset to operate the PFC converter 120 under light loading conditions. In this manner, the mode switching circuit 135 can prevent or mitigate the degradation of the power factor when the power supply operates in the DCM under a light loading condition.

In FIG. 1A, the PFC controller 130 includes analog components, rather than digital circuitry. The load detector 140 may be implemented using a microcontroller which can also include analog components. Further, the output of the PFC converter 120 (i.e., a PFC DC output 125) is connected to a DC-DC converter 145 which provides the DC output 147 of the AC-DC power supply 100.

FIG. 1B is similar to FIG. 1A in that it includes a power supply 150 that has the AC source 105, EMI filter 110, rectifier 115, PFC converter 120, and DC-DC converter 145, and thus, these components are not discussed in detail. However, FIG. 1B illustrates using digital control circuitry, rather than analog control circuitry as in FIG. 1A, to control the PFC converter 120. In this example, the power supply 150 includes a digital PFC controller 155 that includes an embedded load detector 160 that communicates with a mode switching circuit 165. For example, the digital PFC controller 155 may be implemented using a digital signal processor (DSP) or a highly integrated digital PFC controller. The load detector 160 can be implemented using firmware or software executing in the digital PFC controller 155. Similarly, the mode switching circuit 165 can include digital circuitry for adjusting the phase offset between the AC reference voltage $V_{rec}$ and the AC reference current.

While FIG. 1B illustrates using different circuitry than FIG. 1A, the principle operation of the power supplies 100 and 150 is the same. That is, like in FIG. 1A, the mode switching circuit 165 can iteratively change the phase offset between the AC reference voltage and current until the load detector 160 identifies the phase offset that results in the optimal power factor under light loading conditions. Further, while FIG. 1B illustrates the load detector 160 being embedded in the digital PFC controller 155, in another embodiment the load detector 160 may be implemented using a separate digital circuitry (e.g., a separate DSP).

Figure 2:
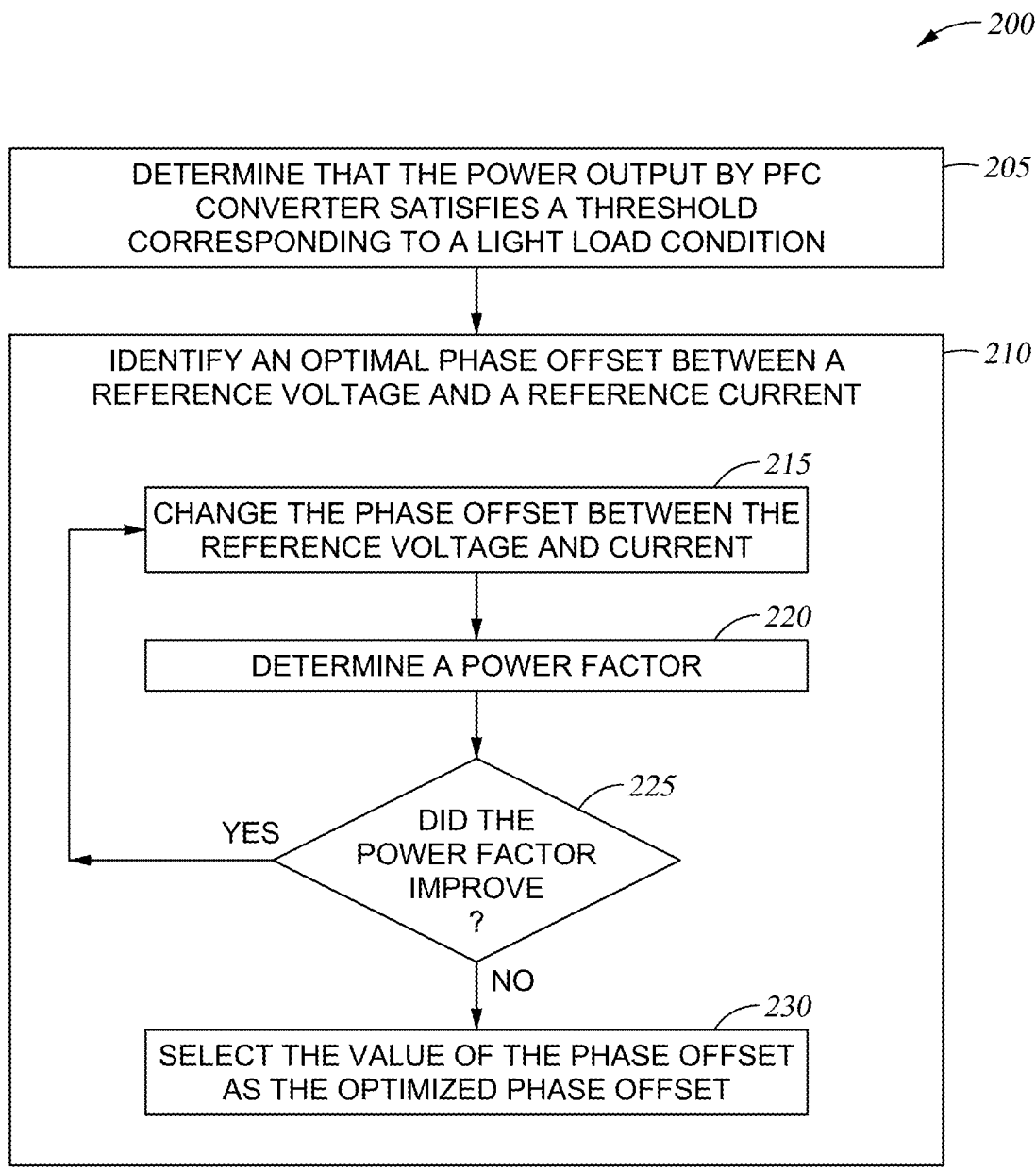
FIG. 2 is a flowchart for optimizing the performance of a PFC converter under light loading conditions, according to one embodiment.

FIG. 2 is a flowchart of a method 200 for optimizing the performance of a PFC converter under light loading conditions, according to one embodiment. At block 205, the load detector (e.g., the load detector 140 or 160 in FIGS. 1A-1B) determines that the power outputted by the PFC converter satisfies a threshold corresponding to a light loading condition. For example, the load detector may receive the output power ($P_o$) of the power supply as an input. The load detector may compare the output power to a light-load threshold (e.g., 15% of the maximum rated power) to determine when the output power drops below the threshold.

At block 210, the power supply identifies an optimal phase offset between the AC reference voltage and an AC reference current. In one embodiment, a mode detection circuit (e.g., the load detector 140 or 160 in FIGS. 1A-1B) includes a phase shifter for adjusting the phase offset between the AC reference voltage and current. Block 210 is subdivided into blocks 215-230 that describe one technique for identifying the optimal phase offset using the mode detection circuit.

At block 215, the mode detection circuit uses its phase shifter to change the phase offset between the AC reference voltage and current. In one embodiment, the mode detection circuit changes the phase offset by a defined interval (e.g., X degrees, or by X percentage) during each iteration.

At block 220, the load detector determines the power factor of the PFC converter based on the changed value of the phase offset. The power factor (PF) can be determined using Equation 1:

$$PF = \frac{1}{\sqrt{1+THD^2}}\cos\theta, \quad (1)$$

Equation 1 illustrates that the power factor, when under non-sinusoidal conditions, is determined by both cos θ and THD, where θ is the overall phase lead angle of the fundamental frequency component of the AC line current over the AC source 105 in FIG. 1A and FIG. 1B (which is discussed in more detail below) and THD is the Total Harmonic Distortion.

At block 225, the load detector determines whether the value of the power factor determined at block 220 is better than the previous power factor measured at the previous phase offset. If so, the method returns to block 215 where the phase offset is adjusted again and the resulting power factor is re-evaluated. That is, blocks 215-225 will iteratively adjust the phase offset (e.g., increase the phase offset in defined intervals) so long as the power factor continues to improve.

Once the load detector identifies a phase offset that result in a power factor that is worse than the previously determined PF, the method 200 proceeds to block 230 where the mode switching circuit selects the previous value of the phase offset as the optimized phase offset. The PFC controller would then use the AC reference current and voltage with the optimized phase offset to control the PFC converter in the power supply. In this manner, the power supply can identify an optimal phase offset for operating the PFC converter under a light loading condition.

FIGS. 3A and 3B illustrate portions of AC-DC power supplies with optimized performance under light loading conditions, according to embodiments herein. Specifically, FIG. 3A illustrates one implementation of the power supply 100 in FIG. 1A (with analog control circuitry) while FIG. 3B illustrates on implementation of the power supply 150 in FIG. 1B (with digital control circuitry). For clarity, the DC-DC converter 145 is omitted in FIGS. 3A and 3B but is understood as being part of the power supplies illustrated in these figures. In one embodiment, FIGS. 3A and 3B can be understood as illustrating PFC stages of the power supplies in FIGS. 1A and 1B.

In FIG. 3A, the EMI filter 110 is simplified to illustrate a single line-to-line equivalent capacitance $C_1+C_2$. However, in a physical implementation, the EMI filter 110 can include multiple capacitors that extend between the positive and negative rails in the PFC converter of the power supply, rather than a single, combination capacitor as shown. Further, the EMI filter 110 can include a common-mode choke or multiple common-mode chokes with an inherent leakage inductance $L_{lk}$ in series with the choke. At 50-60 Hz line frequency, leakage inductance $L_{lk}$ of the common-mode choke has negligible effect on the power factor owing to its small value and therefore low impedance in general; therefore, a single-stage, low-frequency equivalent EMI filter can be adequately modeled by just the capacitors in the EMI filter 110 shown in FIGS. 3A and 3B.

Further, FIG. 3A includes a current sensor 305 that measures an output current $I_B$ of the rectifier 115 (e.g., a full bridge rectifier). This measured current $I_B$ is then used as an input into the load detector 140 (which is implemented using a microcontroller in this example), along with the output power $P_o$ of the PFC converter and the voltage $V_{in}$ of the AC source 105. As discussed in more detail below, the load detector 140 can use measured output voltage, current, or power to detect a light loading condition, calculate the power factor, and send control signals to the mode switching circuitry 135 to adjust a phase offset between the AC reference voltage and current.

Alternatively, the current sensor 305 can be placed before the rectifier 115. In this case, there is no need to replicate the negative half of the AC line current $i_{in1}$ since it already contains both positive and negative half cycles.

The PFC converter 120 is implemented using a boost PFC converter that includes an inductor, diode, and a switch (a metal-oxide field-effect transistor, in this example) connected between the positive and negative lines of the power supply. The output of the PFC converter 120 sets the output voltage $V_o$ of the PFC converter. The power supply also includes a high-frequency capacitor $C_3$ between the output of the rectifier 115 and the input of the PFC converter 120, which passes both low frequency and high-frequency (or switching) currents of the PFC converter, but is primarily for providing a high-frequency current path. A node where the high-frequency capacitor $C_3$ couples to the positive line corresponds to the AC reference voltage $V_{rec}$ which is the same AC reference voltage that is used as an input into the mode switching circuit 135 (after passing through a scalar K).

The mode switching circuitry 135 includes a switch 310, a low-pass filter, and an analog or digital (A or D) phase shifter 315 for generating an AC reference current $i_{ref}$ with a phase offset relative to the AC reference voltage $V_{rec}$. As shown, at the input of the mode switching circuit 135, the AC reference voltage $V_{rec}$ and the corresponding AC reference current $i_{ref}$ are in phase. However, the phase shifter 315 can apply a phase shift to the reference current so at the output of the mode switching circuitry 135, the AC reference current lags AC the reference voltage by an angle.

As shown, the load detector 140 can use a gate driver 320 to control the switch 310. FIG. 3A illustrates the state of the switch 310 when operating in the normal mode (i.e., during moderate or heavy loading conditions). In this state, the upper switch S is closed and the lower switch is off so that the PFC controller receives an AC reference voltage and current that are in phase. However, when detecting a light loading condition, the load detector (the microcontroller) triggers a change of the state of the switch S through the gate driver 320 so that the AC reference current has a phase offset with respect to the AC reference voltage. The load detector 140 can then provide a control signal to the phase shifter 315 to iteratively change the phase offset between the reference current $i_{ref}$ and voltage $V_{rec}$ to identify the phase offset that results in the optimal power factor under the light loading condition.

FIG. 3A also illustrates various analog components in the PFC controller 130 but this is just one example implementation. The embodiments herein can be used with any kind of controller where a phase offset between the AC reference voltage and current provided to the controller 130 can adjust the power factor of the power supply.

FIG. 3B has many of the same components as shown in FIG. 3A, and thus, those components are not discussed in detail here. As already mentioned above, FIG. 3B uses digital circuitry to control the PFC converter 120. In this case, the load detector 160 is implemented using digital circuitry (e.g., analog to digital converter (ADC) and general purpose (GP) input/output (IO)) in the PFC controller 155, although it could be implemented in a separate digital controller. Nonetheless, the load detector 160 in FIG. 3B receives the same inputs as the load detector 140 in FIG. 3A and performs similar functions.

The mode switching circuit 165 in FIG. 3B includes a digital phase shifter 355 that adjusts a phase offset between the AC reference voltage $V_{rec}$ and the AC reference current $i_{ref}$. Otherwise, the mode switching circuit 165 includes the same components as the mode switching circuit 135 in FIG. 3A and functions in the same manner.

Figure 4A:
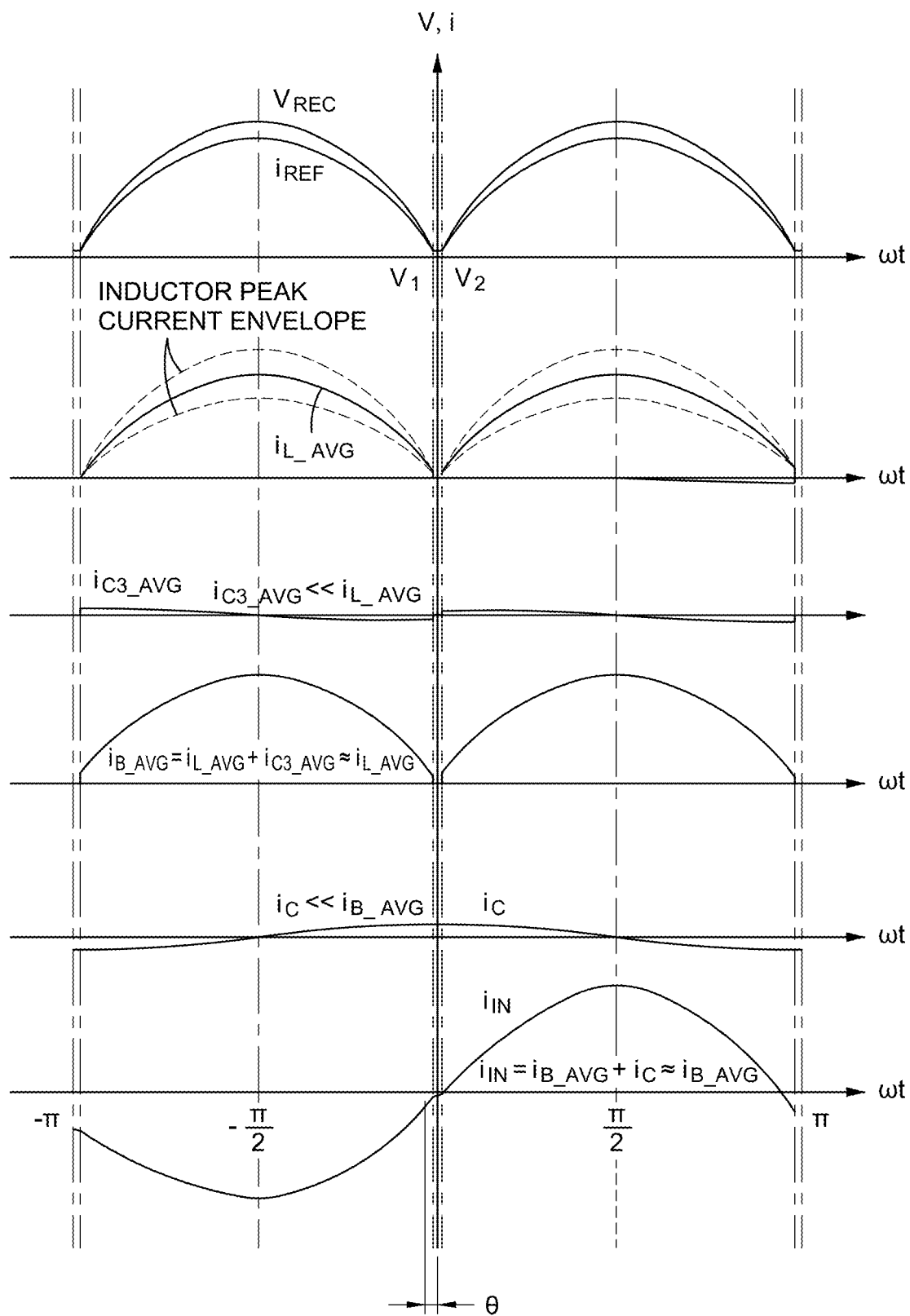
FIGS. 4A and 4B are charts illustrating the performance of a PFC converter under heavy and light loading conditions, according to embodiments herein.
Figure 4B:
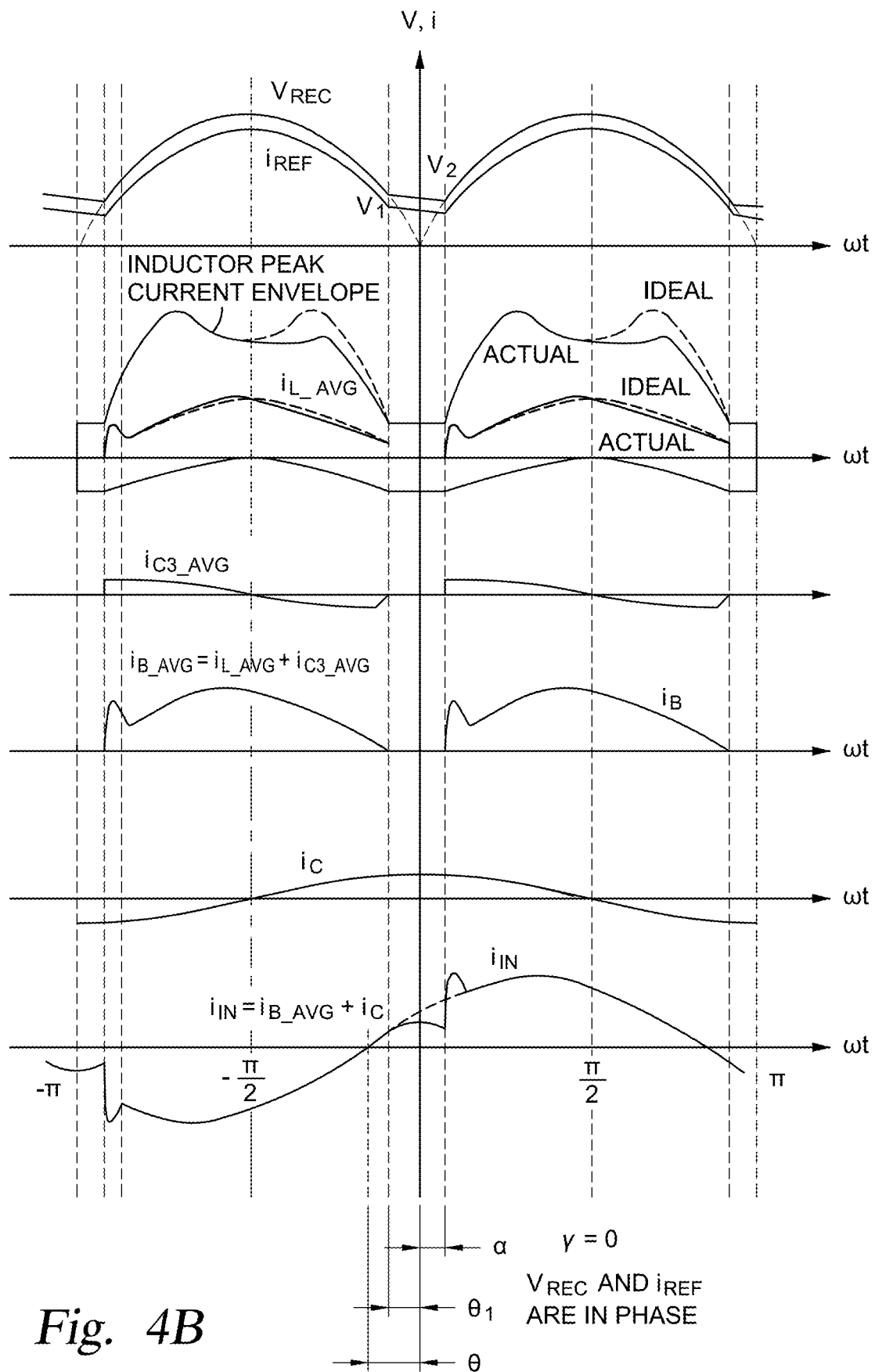

FIGS. 4A and 4B are charts illustrating the performance of a PFC converter under different loading conditions, according to embodiments herein. Specifically, FIG. 4A illustrates operating waveforms for the power supplies in FIGS. 3A and 3B under moderate or heavy loading conditions. FIG. 4B, on the other hand, corresponds to the case under light loading condition before AC current reference phase offset occurs.

FIGS. 4A and 4B show operating waveforms for the rectified AC input voltage $V_{rec}$ (i.e., the reference voltage), reference current $i_{ref}$, average inductor current $i_{L avg}$, average high-frequency capacitor $C_3$ current $i_{C3\_avg}$, EMI filter capacitor ($C_1+C_2$) current $i_C$, and AC input current $i_{in}$. In FIG. 4A, current distortion is low and power factor is near unity when the PFC converter operates in the CCM. However, in FIG. 4B, under light loading conditions, the converter operates in the DCM. The negative EMI capacitor effect and a larger dead angle=($\theta_1+\alpha$) with $\theta_1>\alpha$ near the AC voltage zero crossing results in a lower (degraded) power factor. Since the EMI filter capacitors $C_1$ and $C_2$ are outside the converter control loop, without removing them, little can be done to counter their negative impact on the power factor. However, FIG. 4B illustrates the power factor can be improved by reducing the lead angle $\theta_1$.

Using the method described in FIG. 2, a new phase-adjustable AC current reference $i_{ref}$ with respect to the rectified AC voltage $V_{rec}$ (i.e., the AC reference voltage) is generated either in analog or digital fashion in FIGS. 3A and 3B to re-shape the average inductor current to compensate for both the inherent PFC converter phase lead of angle $\theta_1$ and reduce the capacitive $C_3$ effect. As a result, the average inductor current $I_L$ becomes more symmetrical, or slightly tilted upward between 90 degrees and 180 degrees within one line cycle. As a result, current $i_B$ phase-lead angle $\theta_1$ is reduced, and therefore the power factor can be improved.

Figure 5:
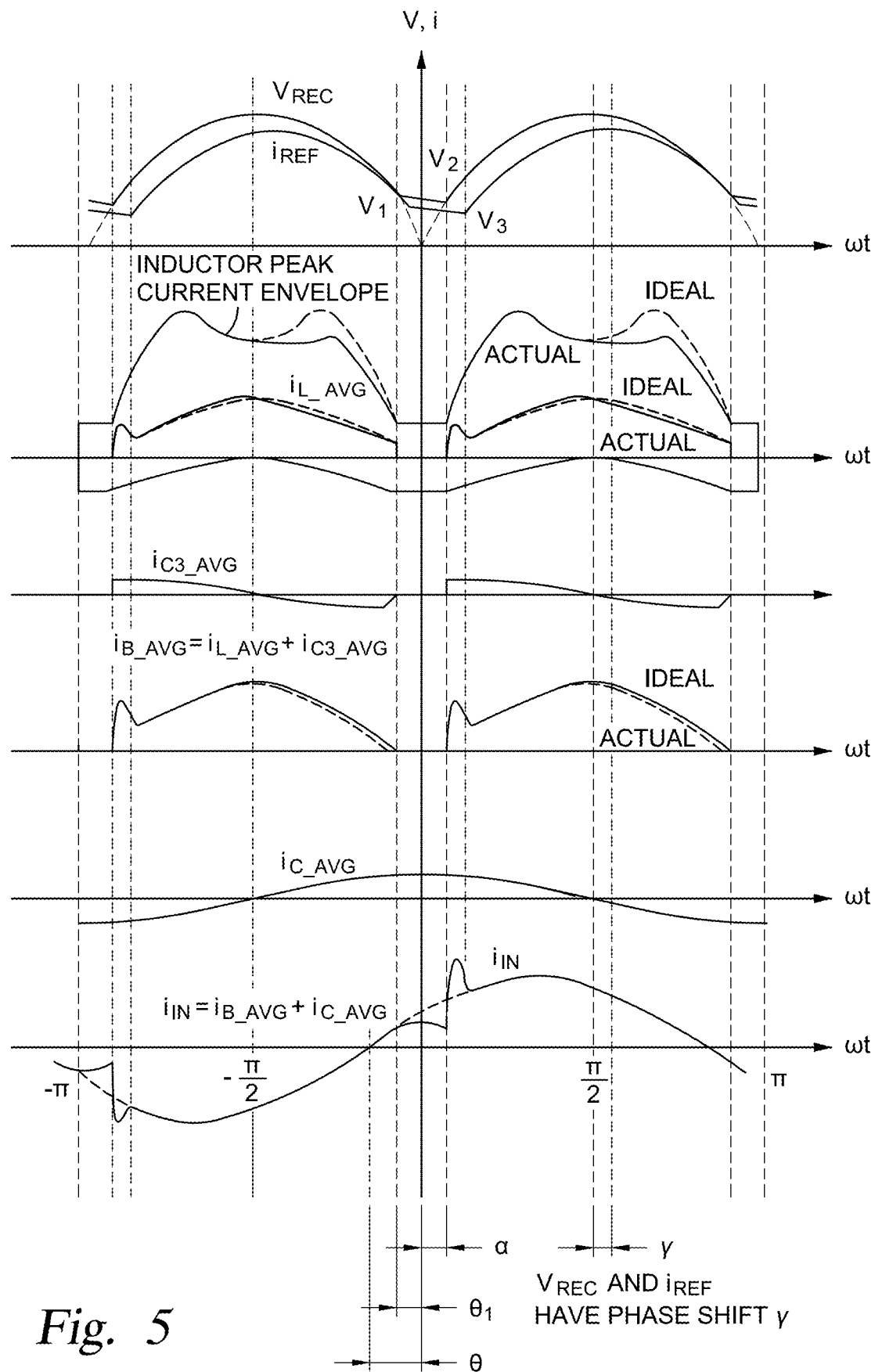
FIG. 5 is a chart illustrating the performance of a PFC converter under light loading condition after the power factor optimization, according to embodiments herein.

FIG. 5 is a chart illustrating the performance of a PFC converter after the power factor optimization, according to embodiments herein. FIG. 4B illustrates the performance of the PFC converter before the power factor optimization, which can be compared to FIG. 5 showing its performance after optimization. Specifically, FIG. 5 illustrates a phase offset is introduced between the AC reference voltage $V_{rec}$ and the AC reference current $i_{ref}$ using the embodiments described herein.

It should be noted that excessive AC current reference phase angle lag γ can cause more current waveform distortion, which can negatively impact power factor improvement according to Equation 1. That is, generating too large of a phase offset between the reference voltage and current can further degrade the power factor. Consequently, the phase lag of the new AC current reference cannot be too large. Thus, the method 200 (and the method in FIG. 7 below) describes adaptive optimization algorithms that minimize the phase lead angle $\theta_1$ while the THD is controlled within an acceptable range.

FIG. 5 illustrates the operating waveforms of the PFC stages illustrated in FIGS. 3A and 3B under light loading conditions with the benefit of the adaptive optimization algorithms described herein. The AC reference current $i_{ref}$ lags behind the AC voltage reference $V_{rec}$ by an angle γ (i.e., the phase offset). This compensates for the capacitor $C_3$ effect so that current $i_{B\_avg}$ can be nearly in phase with rectified voltage $v_{rec}$ with $\theta_1$ being closer to α. This results in a reduction of the overall current phase lead angle θ, and therefore, the power factor is improved.

Figure 6A:
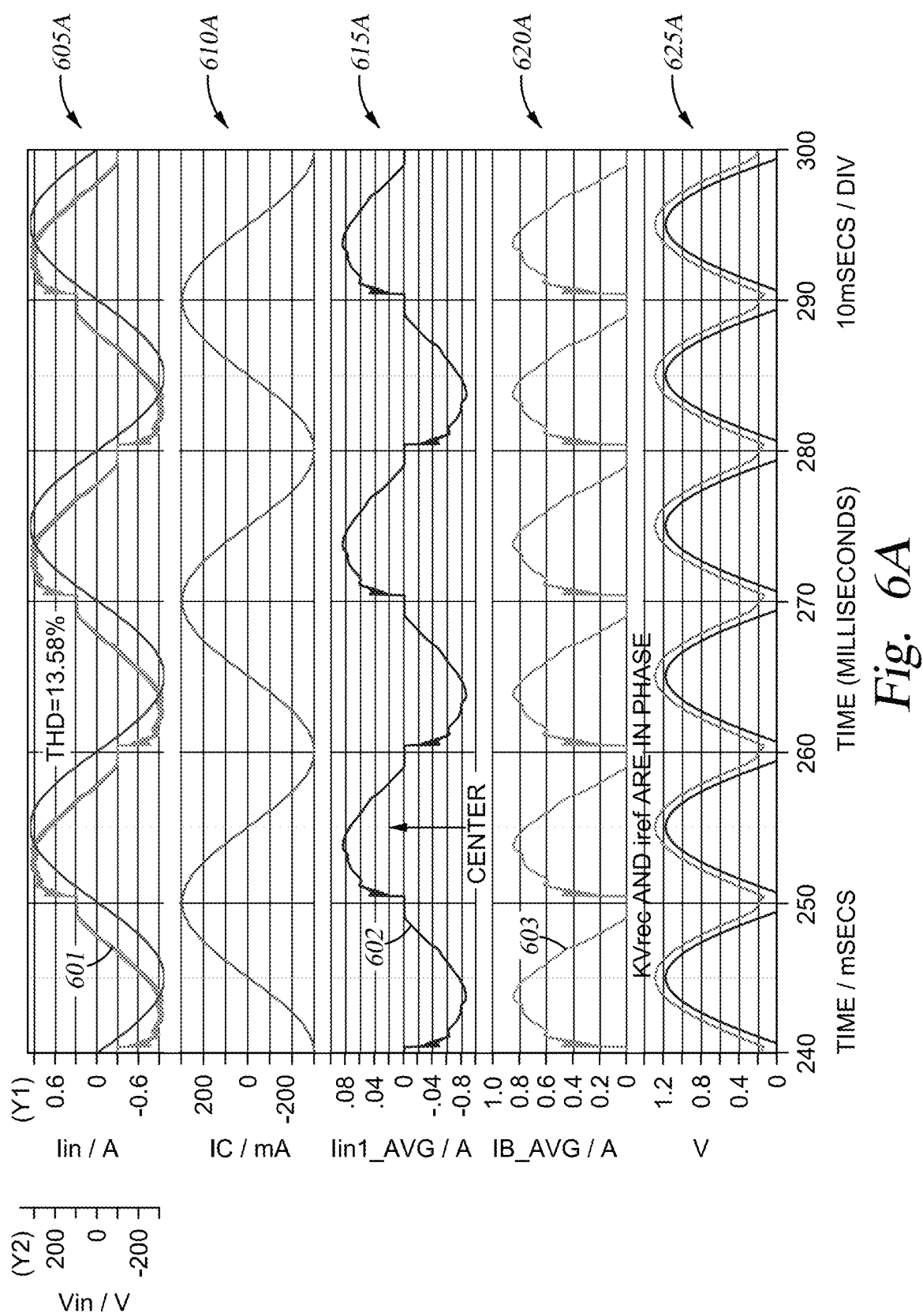
FIGS. 6A-6D are simulations of the operation of power supplies in FIGS. 3A and 3B, according to one embodiment.
Figure 6B:
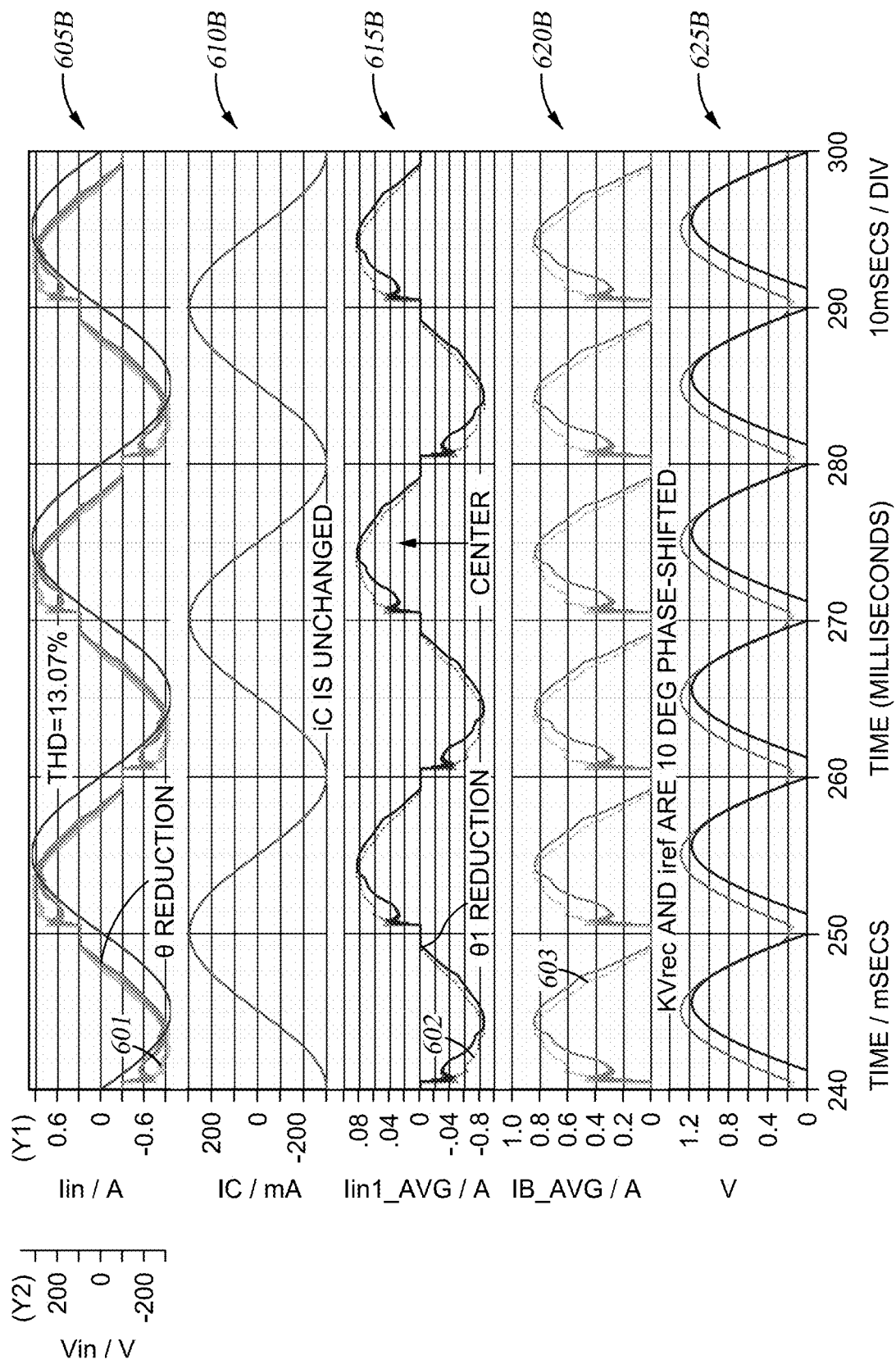
Figure 6C:
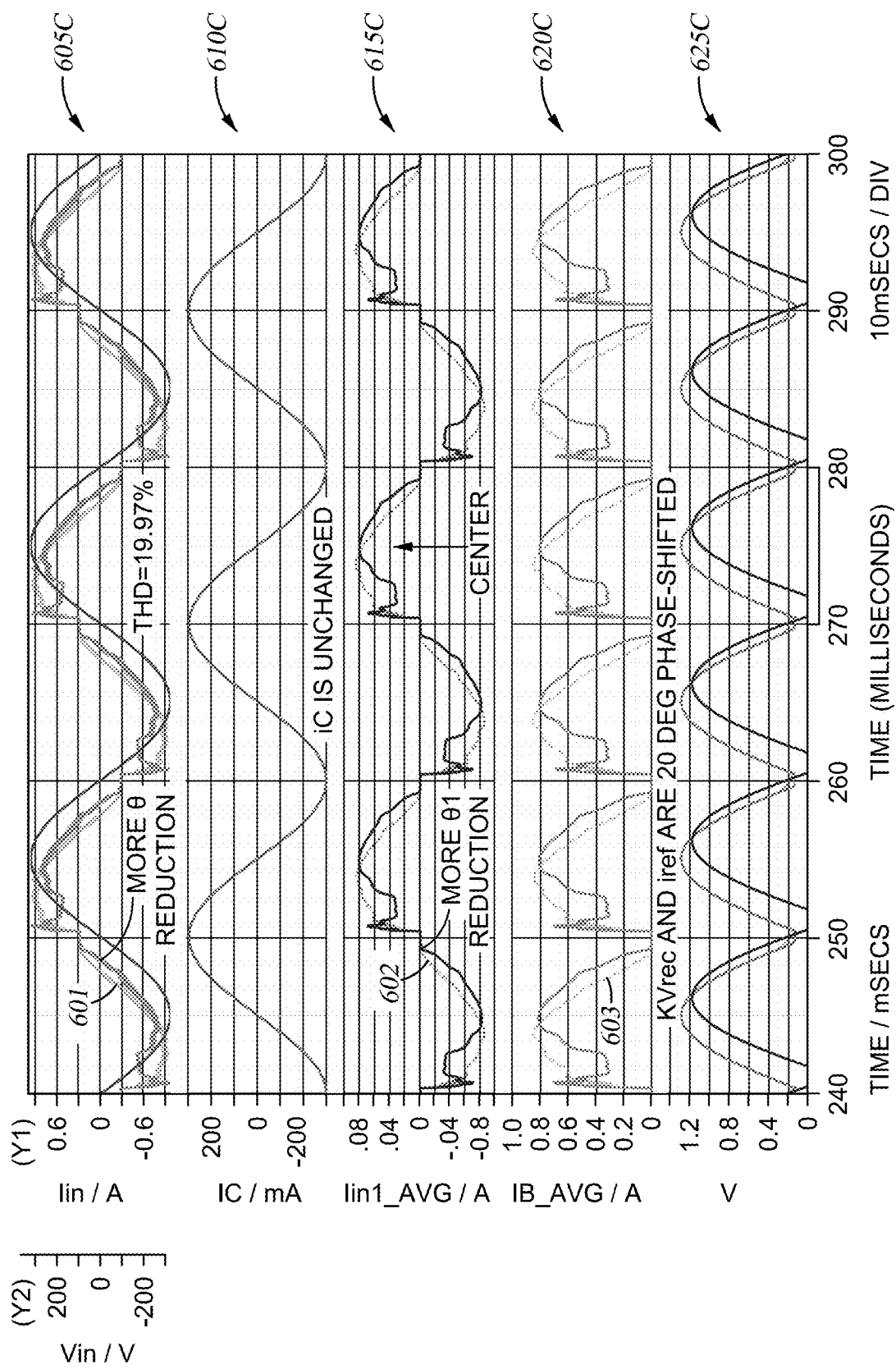
Figure 6D:
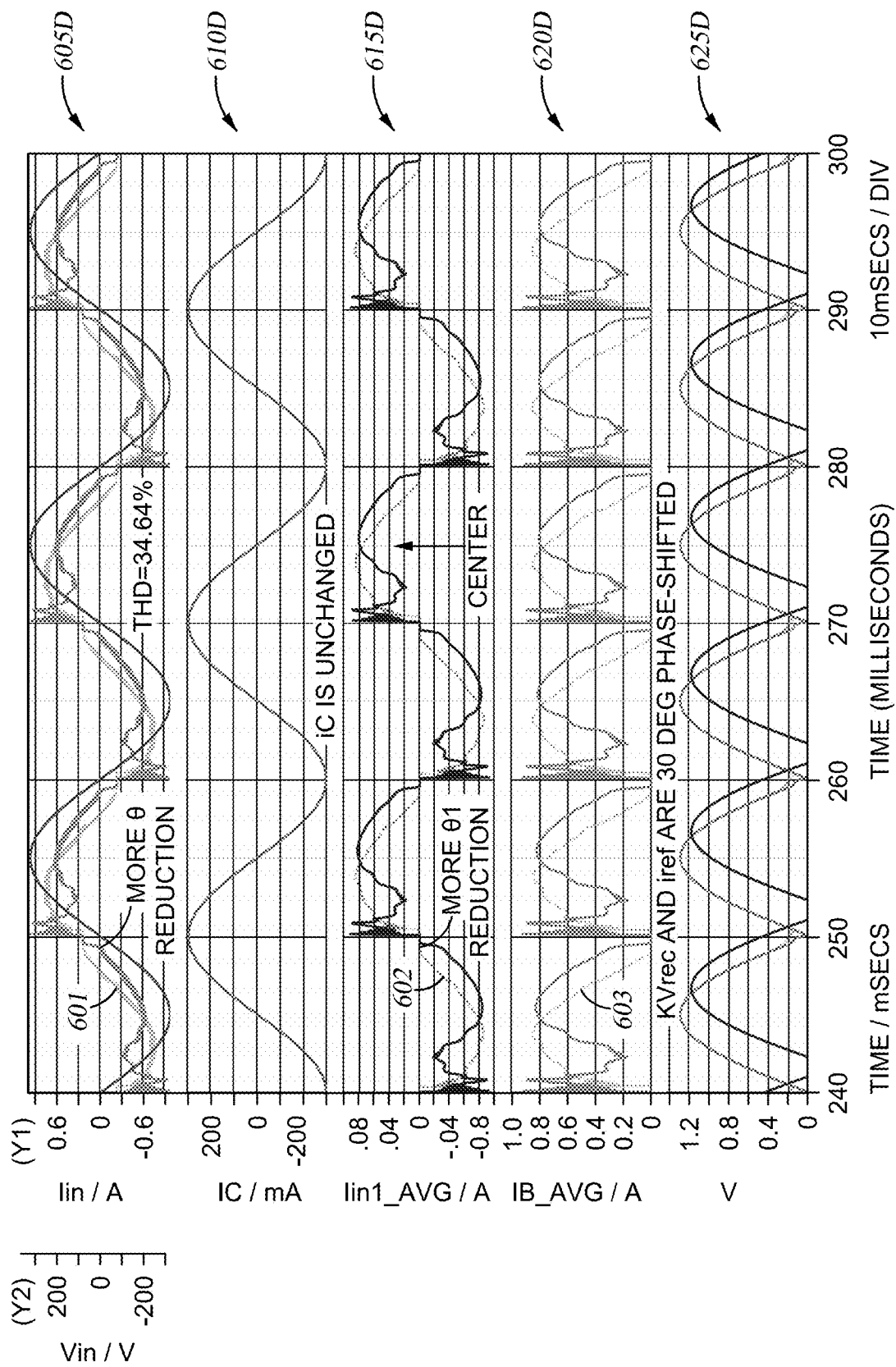

FIGS. 6A-6D are time-domain simulations of the operation of the PFC stages in FIGS. 3A and 3B, according to one embodiment. Specifically, FIG. 6A illustrates the behavior of the power supplies where there is no phase shift between the AC voltage and current references, FIG. 6B illustrates the behavior of the power supplies where there is a 10 degree phase shift between the AC voltage and current references, FIG. 6C illustrates the behavior of the power supplies where there is a 20 degree phase shift between the AC voltage and current references, and FIG. 6D illustrates the behavior of the power supplies where there is a 30 degree phase shift between the AC voltage and current references.

The plot 625A in FIG. 6A illustrates that $KV_{rec}$ (the scaled value of $V_{rec}$) and $i_{ref}$ are substantially in phase. That is, the AC voltage and current references are not phase shifted relative to each other. The plot 605A illustrates the input current 601 (i.e., $I_{in}$) and the input voltage. Moreover, the power supply has a THD of 13.58%. The plot 610A illustrates the current $I_C$ through the capacitance $C_1+C_2$ in the EMI filter 110 in FIGS. 3A and 3B. The plot 615A illustrates an AC line current $I_{in1\_avg}$ current 602 which is discussed in more detail in FIG. 7. The plot 620A illustrates the current $I_{B\_avg}$ 603 which is an average of the current measured by the sensor 305.

The plot 625B in FIG. 6B illustrates that $KV_{rec}$ and $i_{ref}$ are phase shifted by 10 degrees. That is, the AC voltage and current references are phase shifted by 10 degrees relative to each other. This phase shift may have been set as part of performing the method 200 in FIG. 2. The plot 605B illustrates that the 10 degree phase offset results in a reduction in θ which improves the power factor. The plot 605B also illustrates the input current 601 from FIG. 6A (which is shown using a dotted line) so it can be compared to the new input current resulting from the phase shift. Moreover, the phase shift lowered the THD to 13.07%. The plot 610B illustrates that the phase shift between the AC voltage and current references does not change the current $I_C$. The plot 615B illustrates there is a reduction in $\theta_1$ between the current 602 in FIG. 6A illustrated using a dotted line and the new current resulting from the phase shift. Similarly, the plot 620B illustrates a change between the $I_{B\_avg}$ current 603 in FIG. 6A shown in dotted lines and the new $I_{B\_avg}$ current resulting from the phase shift.

The plot 625C in FIG. 6C illustrates that $KV_{rec}$ and $i_{ref}$ are phase shifted by 20 degrees. That is, the AC voltage and current references are phase shifted by 20 degrees relative to each other. The plot 605C illustrates that the 20 degree phase offset results in a further reduction in θ which further improves the power factor. However, the phase shift increased the THD to 19.97%. The plot 610C illustrates that the phase shift between the AC voltage and current references does not change the current $I_C$. The plot 615C illustrates there is a further reduction in $\theta_1$ between the current 602 in FIG. 6A and the new current resulting from the phase shift. Similarly, the plot 620C illustrates a change between the $I_{B\_avg}$ current 603 from FIG. 6A and the new $I_{B\_avg}$ current resulting from the phase shift.

The plot 625D in FIG. 6D illustrates that $KV_{rec}$ and $i_{ref}$ are phase shifted by 30 degrees. That is, the AC voltage and current references are phase shifted by 30 degrees. The plot 605C illustrates that the 30 degree phase offset results in a further reduction in θ which further improves the power factor. However, the phase shift increased the THD to 34.67%. Because both THD and θ affect the power factor (PF) as shown in Equation 1, decreasing θ but increasing the THD can result make the power factor worse instead of better. This is why FIG. 7 below describes a method for considering changes to THD when shifting the AC voltage and current references to improve the power factor under light loading conditions. The plot 610D illustrates that the phase shift between the AC voltage and current references does not change the current $I_C$. The plot 615D illustrates there is a further reduction in $\theta_1$ between the current 602 in FIG. 6A and the new current resulting from the phase shift. Similarly, the plot 620D illustrates a change between the $I_{B\_avg}$ current 603 from FIG. 6A and the new $I_{B\_avg}$ current resulting from the phase shift.

Figure 7:
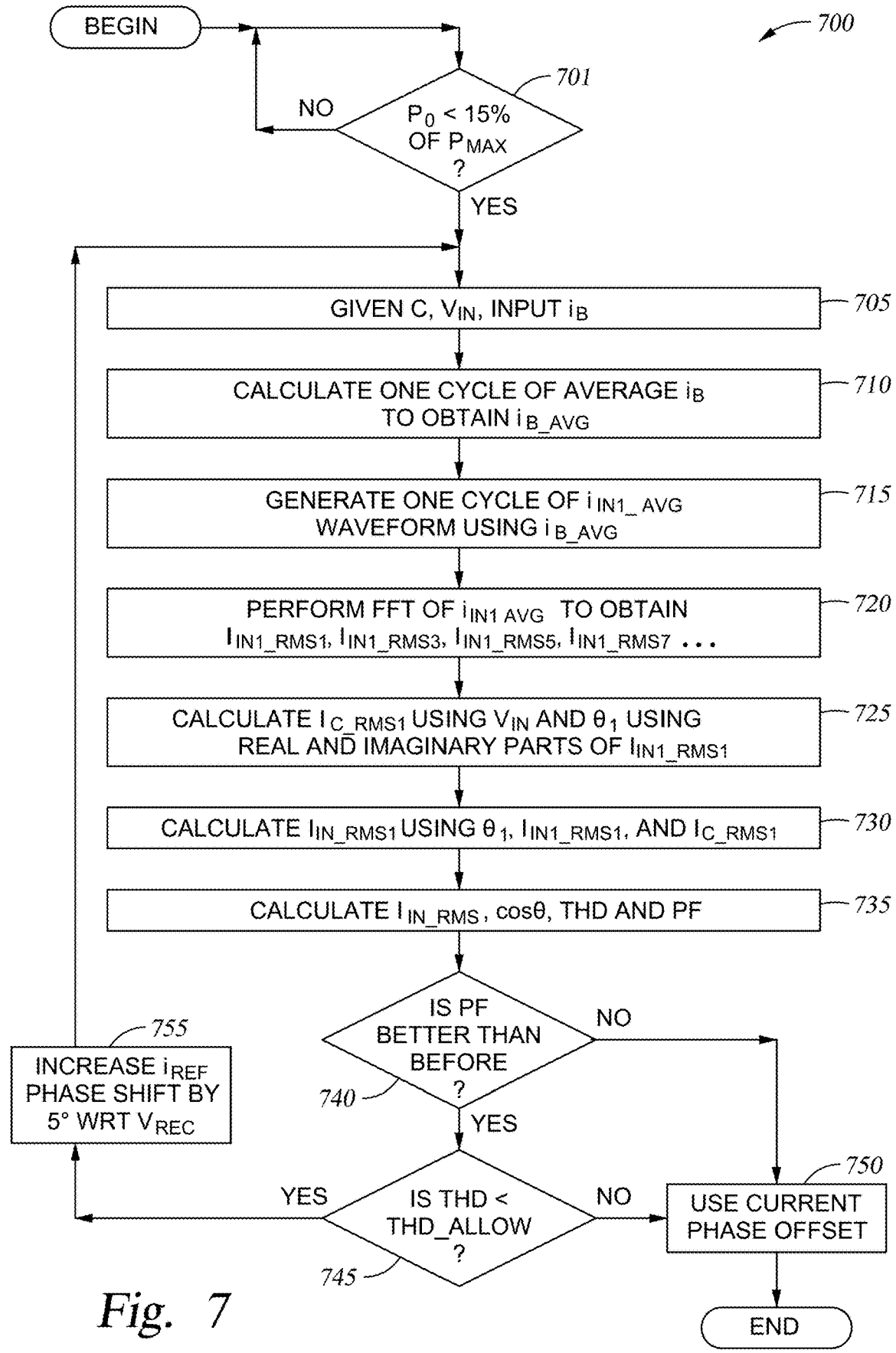
FIG. 7 is a flowchart for optimizing the performance of a PFC converter during light loading conditions, according to one embodiment.

FIG. 7 is a flowchart of a method 700 for optimizing the performance (e.g., power factor) of a PFC converter under light loading conditions, according to one embodiment. The method 700 is just one exemplary implementation of the more general adaptive algorithm described in method 200. Further, for ease of explanation, the method 700 is described using the circuitry, voltages, and currents illustrated in FIGS. 3A, 3B, and 6A-6C.

At block 701, the load detector determines when the output power $P_o$ falls below a predetermined value (e.g., when output power is less than 15% of the maximum power $P_{max}$).

At block 705, the power supply determines the input voltage $V_{in}$ of the AC source and the current $I_B$ measured by the sensor 305. In one embodiment, the value of the capacitance C in the EMI filter (e.g., $C_1+C_2$) is already known.

At block 710, the load detector calculates one cycle of an average current $I_{B\_avg}$ of the measured current using the sensed instantaneous current $I_B$. In one embodiment, the average current $I_{B\_avg}$ is determined based on at least a half cycle of the sensed current $I_B$.

At block 715, the load detector obtains an AC line current $i_{in1\_avg}$ by generating a set of negative values of $I_{B\_avg}$ and shifting them by 180 degrees. However, if the current sensor 305 in FIGS. 3A and 3B is placed before the rectifier 115, there is no need to replicate the AC line current since it already contains both positive and negative half cycles.

At block 720, the load detector performs Fourier analysis (e.g., a Fast Fourier Transform (FFT)) to obtain the frequency spectrum of $I_{in1\_avg}$, from which real and imaginary parts of $I_{in1\_avg}$ at all different odd harmonic frequencies are obtained. These frequency components include $I_{in1\_rms1}$, $I_{in1\_rms3}$, $I_{in1\_rms5}$, $I_{in1\_rms7}$, etc.

At block 725, the load detector determines the EMI filter capacitor C current $I_{C\_rms1}$ using $V_{in}$ and the lead angle $\theta_1$ using real and imaginary parts of $I_{in1\_rms1}$. $I_{C\_rms1}$ can be calculated using the following equation:

$$I_{C\_rms1} = \frac{V_{in}}{X_c} = 2\pi f(C_1 + C_2)V_{in} \tag{2}$$

The current $I_{in1\_rms1}$ lead angle $\theta_1$ with respect to the AC input voltage can be calculated using:

$$\theta_1 = tg^{-1}\left(\frac{\text{Im}(I_{in1\_rms1})}{\text{Re}(I_{in1\_rms1})}\right) \tag{3}$$

At block 730, the microcontroller or DSP determines the RMS value of the fundamental frequency AC line current $I_{in\_rms1}$ using the lead angle $\theta_1$ and the currents $I_{in1\_rms1}$ and $I_{C\_rms1}$. As the EMI filter capacitance $C=(C_1+C_2)$ adds reactive current at the fundamental frequency only, the total AC line harmonic currents in $I_{in\_rms}$ remain the same as in $I_{in1\_rms}$. Only the fundamental frequency current magnitude needs to be re-calculated. $I_{in\_rms1}$ is the fundamental frequency component of the AC input current, and $I_{in1\_rms1}$ is the fundamental frequency of the PFC non-sinusoidal input current, excluding the capacitor $C=(C_1+C_2)$ current $I_{C\_rms1}$, which contains only the fundamental frequency. Because $\theta_1$, $I_{in1\_rms1}$, and $I_{C\_rms1}$ are known from blocks 720 and 725, the AC line fundamental frequency component $I_{in\_rms1}$ can be calculated based on the phasor diagram shown in FIG. 8 and the Cosine Theorem:

$$I_{in\_rms1} = \sqrt{I_{in1\_rms1}^2 + I_{C\_rms1}^2 - I_{in1\_rms1}I_{C\_rms1}\cos(90+\theta_1)} \tag{4}$$

$$= \sqrt{I_{in1\_rms1}^2 + I_{C\_rms1}^2 + I_{in1\_rms1}I_{C\_rms1}\sin(\theta_1)}. \tag{5}$$

At block 735, the microcontroller or DSP calculates $I_{in\_rms}$, cos θ, and THD, where θ is the overall phase lead angle between the fundamental frequency component of the AC input current and voltage. $I_{in\_rms}$—i.e., the total RMS AC line current—can be determined by:

$$I_{in\_rms} = \sqrt{I_{in\_rms1}^2 + \sum_{j=3,5,7}^{\infty} I_{in1\_rmsj}^2}. \tag{6}$$

Figure 8:
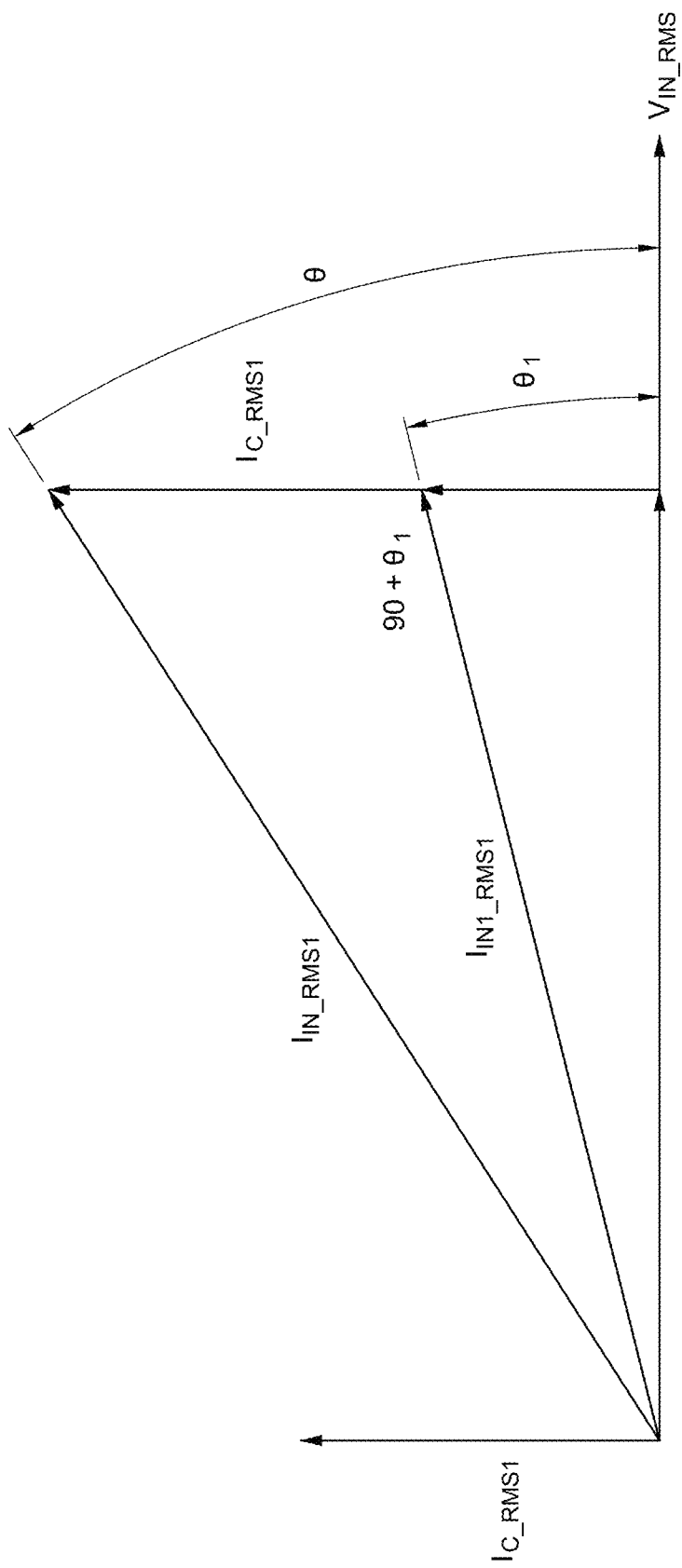
FIG. 8 is a phasor diagram to calculate the fundamental frequency component of AC line current $I_{in\_rms}$ according to one embodiment.

Since the real power is unchanged with or without the EMI filter capacitors, it follows from FIG. 8 that:

$$I_{in\_rms1} \cos \theta = I_{in1\_rms1} \cos \theta_1, \tag{7}$$

The displacement power factor is determined as:

$$\cos\theta = \frac{I_{in1\_rms1}}{I_{in\_rms1}}\cos\theta_1. \tag{8}$$

THD is given by:

$$THD = \frac{\sqrt{I_{in\_rms3}^2 + I_{in\_rms5}^2 + \cdots}}{I_{in\_rms1}}. \tag{9}$$

Now that cos θ and THD can be determined using Equations 8 and 9, the overall power factor for the power supply can be calculated using Equation 1.

At block 740, the microcontroller or DSP determines whether the power factor is better than a previously calculated power factor. If the power factor has not improved, then the microcontroller or DSP has found the optimal phase offset between the AC reference voltage and current. The method 700 proceeds to block 750 where the power supply uses the current phase offset between the AC reference voltage and current to input these control signals into the PFC controller.

However, if the power factor has improved, the method 700 proceeds to block 745 where the load detector determines whether the THD is below a THD threshold (THD_allow). If the THD determined at block 735 has reached or exceeded the THD threshold, the method proceeds to block 750.

However, assuming the THD threshold has not yet been reached, the method 700 proceeds to block 755 where the load detector instructs the phase shifter to increase the AC reference current $i_{ref}$ phase shift by a fixed amount (e.g., 5 degrees) with respect to the AC reference voltage $V_{rec}$. That is, the phase shifter adjusts the phase offset between the AC reference voltage and reference current and then proceeds to block 705 where the method 700 repeats. By performing this process iteratively (e.g., incrementally shifting the phase until identifying the optimal power factor or reaching the THD threshold), the load detector can identify the optimal phase offset between the AC reference current $i_{ref}$ and AC reference voltage $V_{rec}$.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A control system for a Power Factor Correction (PFC) converter, comprising:
   circuitry configured to:
   determine that power outputted by the PFC converter is below a threshold corresponding to a light loading condition; and
   identify an optimized phase offset between an AC reference voltage and an AC reference current used to control the PFC converter by iteratively:
   changing the phase offset between the AC reference voltage and the AC reference current;
   determining a power factor of the PFC converter based on a changed value of the phase offset; and
   determining whether the power factor is better than a previous power factor determined when the phase offset had a different value.

2. The control system of claim 1, wherein the circuitry is configured to:
   transmit a control signal to activate a phase shifter in response to determining the output power of the PFC converter is below the threshold,
   wherein the phase shifter outputs the AC reference voltage and the AC reference current with the iterative phase offsets that are determined by the circuitry.

3. The control system of claim 1, wherein identifying the optimized phase offset further comprises:
   receiving a measurement of a PFC converter input current;
   determining an average of the PFC converter input current based on at least a half cycle of the PFC converter input current;
   identifying the fundamental frequency component of the average of the PFC converter input current;
   determining a capacitor current flowing through a capacitor in an electromagnetic interference (EMI) filter;
   determining an AC line fundamental frequency current based on the capacitor current and a phase lead angle; and
   determining a total harmonic distortion (THD) and an overall phase lead angle based on the AC line fundamental frequency current, wherein the THD and the overall phase lead angle are used to determine the power factor.

4. The control system of claim 3, wherein identifying the optimized phase offset further comprises:
   determining whether the THD is less than a THD threshold before increasing the phase offset between the AC reference voltage and the AC reference current.

5. The control system of claim 3, wherein identifying the fundamental frequency component of the average of the PFC converter input current comprises:
   performing a Fast Fourier Transform on the average of the line current, wherein the line current is the current at the input of a full bridge rectifier in the PFC converter.

6. The control system of claim 3, wherein the capacitor current corresponds to a plurality of capacitors coupled between AC input lines to the PFC converter, wherein the plurality of capacitors is part of the EMI filter.

7. The control system of claim 1, wherein the optimized phase offset is identified when a power factor currently being considered is not better than the previous power factor determined in the immediately previous iteration.

8. A power supply, comprising:
   a Power Factor Correction (PFC) converter; and
   control circuitry configured to:
   determine that power outputted by the PFC converter is below a threshold corresponding to a light loading condition; and
   identify an optimized phase offset between an AC reference voltage and an AC reference current used to control the PFC converter by iteratively:
   changing the phase offset between the AC reference voltage and the AC reference current;
   determining a power factor of the PFC converter based on a changed value of the phase offset; and
   determining whether the power factor is better than a previous power factor determined when the phase offset had a different value.

9. The power supply of claim 8, wherein the circuitry is configured to:
   transmit a control signal to activate a phase shifter in response to determining the output power of the PFC converter is below the threshold,
   wherein the phase shifter outputs the AC reference voltage and the AC reference current with the iterative phase offsets that are determined by the circuitry.

10. The power supply of claim 8, wherein identifying the optimized phase offset further comprises:
    receiving a measurement of a PFC converter input current;
    determining an average of the PFC converter input current based on at least a half cycle of the PFC converter input current;
    identifying the fundamental frequency component of the average of the PFC converter input current;
    determining a capacitor current flowing through a capacitor in an electromagnetic interference (EMI) filter;
    determining an AC line fundamental frequency current based on the capacitor current and a phase lead angle; and
    determining a total harmonic distortion (THD) and an overall phase lead angle based on the AC line fundamental frequency current, wherein the THD and the overall phase lead angle are used to determine the power factor.

11. The power supply of claim 10, wherein identifying the optimized phase offset further comprises:
    determining whether the THD is less than a THD threshold before increasing the phase offset between the AC reference voltage and the AC reference current.

12. The power supply of claim 10, wherein identifying the fundamental frequency component of the average of the PFC converter input current comprises:
    performing a Fast Fourier Transform on the average of the line current, wherein the line current is the current at the input of a full bridge rectifier in the PFC converter.

13. The power supply of claim 10, wherein the capacitor current corresponds to a plurality of capacitors coupled between AC input lines to the PFC converter, wherein the plurality of capacitors is part of the EMI filter.

14. The power supply of claim 8, wherein the optimized phase offset is identified when a power factor currently being considered is not better than the previous power factor determined in the immediately previous iteration.

15. A method comprising:
    determining that power outputted by a PFC converter is below a threshold corresponding to a light loading condition; and identifying an optimized phase offset between an AC reference voltage and an AC reference current used to control the PFC converter by iteratively:
  changing the phase offset between the AC reference voltage and the AC reference current;
  determining a power factor of the PFC converter based on a changed value of the phase offset; and
  determining whether the power factor is better than a previous power factor determined when the phase offset had a different value.

16. The method of claim 15, further comprising:
transmitting a control signal to activate a phase shifter in response to determining the output power of the PFC converter is below the threshold,
wherein the phase shifter outputs the AC reference voltage and the AC reference current with the iterative phase offsets.

17. The method of claim 15, wherein identifying the optimized phase offset further comprises:
  receiving a measurement of a PFC converter input current;
  determining an average of the PFC converter input current based on at least a half cycle of the PFC converter input current;
  identifying the fundamental frequency component of the average of the PFC converter input current;
  determining a capacitor current flowing through a capacitor in an electromagnetic interference (EMI) filter;
  determining an AC line fundamental frequency current based on the capacitor current and a phase lead angle; and
  determining a total harmonic distortion (THD) and an overall phase lead angle based on the AC line fundamental frequency current, wherein the THD and the overall phase lead angle are used to determine the power factor.

18. The method of claim 17, wherein identifying the optimized phase offset further comprises:
  determining whether the THD is less than a THD threshold before increasing the phase offset between the AC reference voltage and the AC reference current.

19. The method of claim 17, wherein identifying the fundamental frequency component of the average of the PFC converter input current comprises:
  performing a Fast Fourier Transform on the average of the line current, wherein the line current is the current at the input of a full bridge rectifier in the PFC converter.

20. The method of claim 17, wherein the capacitor current corresponds to a plurality of capacitors coupled between AC input lines to the PFC converter, wherein the plurality of capacitors is part of the EMI filter.

* * * * *

UNITED STATES PATENT AND TRADEMARK OFFICE
CERTIFICATE OF CORRECTION

PATENT NO. : 11,522,442 B1
APPLICATION NO. : 17/444089
DATED : December 6, 2022
INVENTOR(S) : Ruqi Li et al.

Page 1 of 1

It is certified that error appears in the above-identified patent and that said Letters Patent is hereby corrected as shown below:

In the Specification

In Column 1, Line 63, delete "$I_{in\_rms}$" and insert -- $I_{in\_rms}$, --.

In Column 8, Line 6, delete "a." and insert -- α. --.

Signed and Sealed this
Fourteenth Day of February, 2023

Katherine Kelly Vidal
*Director of the United States Patent and Trademark Office*